(12) United States Patent
Mikami et al.

(10) Patent No.: US 6,417,143 B1
(45) Date of Patent: *Jul. 9, 2002

(54) ROLLING BEARINGS AND GREASES FOR THE SAME

(75) Inventors: Hidenobu Mikami; Koya Ohira; Yoshinobu Akamatsu; Masaki Egami; Takashi Yasunishi, all of Mie (JP)

(73) Assignee: NTN Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/429,163

(22) Filed: Oct. 28, 1999

(30) Foreign Application Priority Data

Oct. 30, 1998 (JP) .............................. 10-310806
Nov. 12, 1998 (JP) .............................. 10-322477

(51) Int. Cl.$^7$ ..................... C10M 117/04; F16C 33/10
(52) U.S. Cl. .................. 508/465; 508/485; 508/496; 508/498; 508/539; 384/13
(58) Field of Search ................... 384/13; 508/465, 508/539

(56) References Cited

U.S. PATENT DOCUMENTS

| | | | | |
|---|---|---|---|---|
| 4,410,435 A | * | 10/1983 | Naka et al. ............... | 252/42.1 |
| 4,859,352 A | * | 8/1989 | Waynick ................... | 252/41 |
| 4,879,054 A | * | 11/1989 | Waynick ................... | 252/41 |
| 5,059,336 A | * | 10/1991 | Naka et al. ............... | 252/33.3 |
| 5,385,412 A | * | 1/1995 | Yatabe et al. ............ | 384/492 |
| 5,641,841 A | * | 6/1997 | Diaz et al. ............... | 525/540 |
| 5,707,944 A | * | 1/1998 | Yokouchi et al. ......... | 508/485 |
| 5,714,444 A | * | 2/1998 | Yokouchi et al. ......... | 508/539 |
| 5,728,659 A | * | 3/1998 | Naka et al. ............... | 508/552 |
| 5,840,666 A | * | 11/1998 | Yokouchi et al. ......... | 508/107 |
| 5,854,185 A | * | 12/1998 | Roth et al. ............... | 508/492 |
| 5,910,470 A | * | 6/1999 | Minami et al. ........... | 508/468 |
| 5,915,844 A | * | 6/1999 | Nanbu et al. ............. | 384/462 |
| 5,916,853 A | * | 6/1999 | Hamori et al. ........... | 508/439 |
| 6,020,290 A | * | 2/2000 | Takata et al. ............. | 508/364 |
| 6,056,072 A | * | 5/2000 | Koltermann et al. ..... | 175/227 |
| 6,063,740 A | * | 5/2000 | Kinoshita et al. ........ | 508/364 |
| 6,063,743 A | * | 5/2000 | Seubert et al. ........... | 508/481 |

* cited by examiner

Primary Examiner—Ellen M. McAvoy
(74) Attorney, Agent, or Firm—Wenderoth, Lind & Ponack, L.L.P.

(57) ABSTRACT

Rolling bearings are proposed in which acoustic deterioration is suppressed which maintaining low dust, low torque and long life. Also, a grease for rolling bearings is proposed which is less likely to scatter under centrifugal force at high speed rotation, whereby preventing malfunction and noise of electronic information devices. A lubricating oil film of an ester-series oil having a dynamic viscosity at 40° C. of 35 mm$^2$/s or over is formed on the friction surface of a rolling bearing. There is also provided a high-speed rolling bearing in which a lubricating grease having its worked penetration (JIS K2220) adjusted to 175–250 is retained therein. The grease is preferably prepared by adding a thickening agent containing 50 wt % or more of an aliphatic lithium salt 12–24 in carbon number to a base oil comprising 30 wt % or more of an ester oil having a dynamic viscosity at 40° C. of 10 mm$^2$/s or over, and having its worked penetration (JIS K2220) adjusted to 175–250.

5 Claims, 1 Drawing Sheet

ROLLING BEARINGS AND GREASES FOR THE SAME

BACKGROUND OF THE INVENTION

This invention relates to rolling bearings, more particularly to rolling bearings used for rotary shafts of information devices such as hard disk drive devices (HDD), video tape recorders (VTR), digital audio tape recorders (DAT), and laser beam printers (LBP), and high-speed rolling bearings for supporting small-diameter rotary shafts rotating at a high speed and used with magnetic recording/reproducing devices, and greases for such rolling bearings.

Usually, for lubrication of rolling bearings used in information devices, lubricating oil and/or semisolid lubricating oil such as grease is used. With reducing size and improving performance of information devices, acoustic levels required for bearings for rotary shafts are becoming severer year by year.

For example, it is described in unexamined Japanese patent publication 8-283767 that bearings exhibit excellent acoustic properties during high-temperature, high-speed rotation by using a lubricant composition containing as an essential component an ester oil having a dynamic viscosity at 40° C. of 10 mm$^2$/s or over.

FIG. 1 shows a structure for supporting rotary shafts of a hard disk drive device (hereinafter abbreviated to "HDD"). This support structure has two rotary shafts, i.e. a rotary shaft 3 rotatably supporting a magnetic disk 2 through a hub 1, and a rotary shaft 5 for an arm 4 carrying a magnetic head (not shown) on its tip. These rotary shafts 3, 5 are supported by a pair of ball bearings 6, 7, respectively, each pair of bearings being arranged axially spaced from each other.

The inner rings 8 of the pair of ball bearings 6 supporting the rotary shaft 3 are mounted so as to rotate together with the rotary shaft 3, and the outer rings 9 are fixedly fitted in a tubular fixing element 11 of a spindle motor 10, and the rotary shaft 3 is fixed to the center of a deep dish-shaped rotary element 12 to rotate the rotary shaft 3 by the spindle motor 10.

Rotatably supported by such a support structure, the magnetic disk 2 rotates at high speed corresponding to the rotating speed of the spindle motor 10. The arm 4 (called swing arm) carrying a magnetic head for reading and writing magnetic data works suitably with the magnetic disk 2.

The end of the arm 4 is supported by the top of the rotary shaft 5. The latter is rotated by an actuator (not shown) comprising a coil about its axis to swing the tip of the arm 4 a predetermined angle, thereby moving the magnetic head to a required position. By this rotation of the rotary shaft 5, the magnetic head can read and write magnetic data in an effective record area of the magnetic disk 2.

For conventional rolling bearings for supporting rotary shafts of HDDs, high-precision miniature ball bearings (see JIS B 0104 "ball bearings having an outer diameter less than 9 mm") are used. At least for dimensional and rotating accuracy, those in the JIS class 5 or higher are required.

It is described in unexamined Japanese patent publication 8-283767 that the bearing can suppress dust, reduce torque and extend the life while maintaining good acoustic properties even during high-temperature, high-speed rotation. But, since acoustic deterioration during high-speed rotation was not considered sufficiently, selection of lubricating oil was a problem. Normally, when a bearing is rotated at high speed for some period of time, it becomes difficult to form a good oil film. Thus the acoustic level after operation for a certain time period worsens compared with the initial acoustic level. Thus, if the kind of lubricating oil and its dynamic viscosity are not properly selected, the acoustic level may considerably deteriorate after operation at high-speed rotation for a certain time.

An object of the present invention is to provide a rolling bearing in which the acoustic deterioration is suppressed while maintaining low dust, low torque and long life.

For bearings used in devices for recording and reproducing electronic information such as HDDS, VTRS, LBPs, CDs and DVDS, with requirements for compactness of these devices, low torque is also desired to save power consumption.

Also, in such rolling bearings, lubricating oil or grease is used by applying or filling in as small an amount as possible to reduce the rotation torque of the rolling bearing. Even if only a small amount of lubricant scatters by centrifugal force from the bearing of an electronic information recording/reproducing device which is rotating at high speed, lubrication tends to become insufficient.

If lubricating oil is short on the friction surface of the small-diameter rolling bearing which is rotating at high speed, the rotation torque of the bearing will increase rapidly, thus affecting badly on the precision mechanisms of the electronic information recording/reproducing devices. This increases the possibility of malfunction and deteriorates reliability in recording/reproducing of electronic information.

Further, if lubricating oil becomes scarce on the friction surface of the rolling bearing, noise will be produced at the same time.

Another object of the present invention is to provide a grease for rolling bearings which is less likely to scatter under centrifugal force at high speed rotation, whereby preventing malfunction and noise of electronic information devices and which extends the life of this type of rolling bearings.

SUMMARY OF THE INVENTION

According to this invention, a lubricating oil film of an ester-series oil having a dynamic viscosity at 40° C. of 35 mm$^2$/s or over is formed on the friction surface of a rolling bearing. The bearing may be a ball bearing having an inner ring having an inner diameter of 8 mm or under. Further, grease may be sealed in the bearing.

Such a rolling bearing using such an ester-series oil as lubricating oil can suppress acoustic deterioration during high-speed rotation.

According to the present invention, there is also provided a high-speed rolling bearing in which a lubricating grease having its worked penetration (JIS K2220) adjusted to 175–250 is retained therein.

According to the present invention, a grease for a high speed rolling bearing having its worked penetration (JIS K2220) adjusted to 175–250 is also provided.

The grease is preferably prepared by adding a thickening agent comprising a lithium soap or an urea to a base oil comprising an ester oil having a dynamic viscosity at 40° C. of 10 mm$^2$/s or over.

The grease is more preferably prepared by adding a thickening agent containing 50 wt % or more of an aliphatic lithium salt 12–24 in carbon number to a base oil comprising 30 wt % or more of an ester oil having a dynamic viscosity at 40° C. of 10 mm$^2$/s or over, and having its worked penetration (JIS K2220) adjusted to 175–250.

The grease of this invention, the worked penetration of which has been adjusted to a predetermined range, maintains a predetermined consistency when agitated in a rolling bearing rotating at high speed and subjected to shearing. Thus it is less likely to scatter or leak out of the bearing. This prevents insufficient lubrication of the bearing.

With the grease, in which a base oil preferably containing 30 wt % or more of an ester oil having a dynamic viscosity at 40° C. of 10 mm$^2$/s or over is used, the lubricating oil (base oil) supplied onto the friction surface from the grease has a predetermined dynamic viscosity, so that a lubricating oil film of a predetermined thickness is formed on the friction surface. This improves lubricity and reduces and stabilizes turning torque while the rolling bearing is rotating at high speed.

Further, the grease to which is added a thickening agent containing 50 wt % or more of an aliphatic lithium salt 12–24 in carbon number, due to excellent thickening properties of the thickening agent, shows stable consistency at high temperatures.

Due to the fact that the lubricating grease is less likely to scatter and leak, the high-speed rolling bearing according to this invention can rotate at high speed with low torque without causing poor lubrication and producing noise. The rolling bearing enjoys a long life.

Further, it prevents malfunction of electronic information recording/reproducing devices during recordation and reproduction.

Other features and objects of the present invention will become apparent from the following description made with reference to the accompanying drawing, in which:

DETAILED DESCRIPTION OF THE PREFERRED EMBODIMENT

Figure 1:
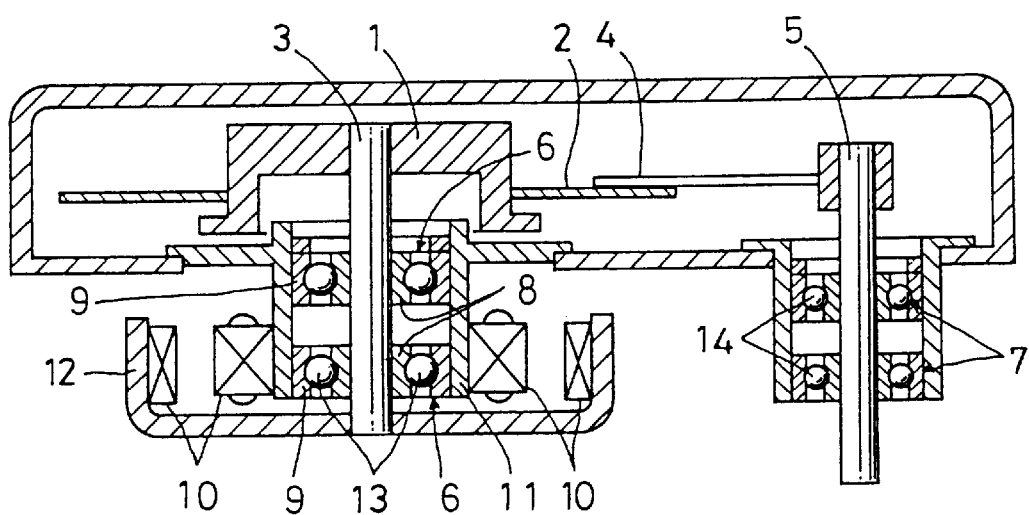
FIG. 1 is a sectional view showing a support structure for supporting a rotary shaft of a hard disk drive device.

The rolling bearings described in the present invention have rolling elements comprising "rollers" or "balls" disposed between an inner ring and an outer ring and supports a rotary shaft from its radial and/or thrust direction. The intervals between the rolling elements are determined by a retainer. Many rolling bearings having an inner diameter of less than 10 mm and an outer diameter of about 3–30 mm are usually used in electronic information recording/reproducing devices. What is called miniature bearings are among these bearings.

The lubricating oil used in the present invention for rolling bearings (except the one used as a base oil of grease) comprises an ester-series lubricating oil, whose main component, that is, ester oil may be a diester oil obtained by reacting a dibasic acid with a branched alcohol, an aromatic ester oil obtained by reacting an aromatic tribasic acid with a branched alcohol, or a hindered ester oil obtained by reacting a polyhydric alcohol with a monobasic acid.

Diester oils include dioctyl adipate (DOA), diisobutyl adipate (DIB), dibutyl adipate (DBA), dioctyl azelate (DOZ), dibutyl sebacate (DBS), dioctyl sebacate (DOS), and methyl-acetylricinolate (MAR-N).

Aromatic ester oils include trioctyl trimellitate (TOTM), tridecyl trimellitate, and tetraoctyl pyromellitate.

Hindered ester oils or polyol ester oils include ones obtained by reacting the following polyhydric alcohols with monobasic acids.

Monobasic acids to be reacted with polyhydric alcohols may be single or plural. A complex ester (which is an oligoester) as a lubricating oil may be manufactured by reacting a polyhydric alcohol with a mixed fatty acid which consists of a monobasic acid and a dibasic acid.

Polyhydric alcohols include trimethylolpropane (TMP), pentaerythritol (PE), dipentaerythritol (DPE), neopentylglycol (NPG), and 2-methyl-2-propyl-1,3-propanediol (MPPD).

Monobasic acids may be monohydric fatty acids which are 4–22 in carbon number. Specifically they include acetic acid, valeric acid, caproic acid, caprylic acid, enanthic acid, pelargonic acid, capric acid, undecanoic acid, lauric acid, myristic acid, palmitic acid, beef tallow acid, stearic acid, caploleinic acid, undecylenic acid, linderic acid, tsuzuic acid, physeteric acid, myristoleinic acid, palmitoleic acid, petroselinic acid, oleic acid, elaidic acid, asclepain acid, vaccenic acid, sorbic acid, linoleic acid, linolenic acid, sabinic acid, ricinolic acid, nonadecanoic acid, arachic acid, heneicosanic acid, behenic acid, brassidic acid, and erucic acid.

The ester-series lubricating oil used in this invention should have a dynamic viscosity at 40° C. of 35 mm$^2$/s or over, preferably 40 mm$^2$/s or over. With an ester lubricating oil having a dynamic viscosity at 40° C. of less than 35 mm$^2$/s, a lubricating oil film will not form sufficiently at the initial stage of rotation of the bearing during high-temperature, high-speed rotation, so that the lubricating oil film will break, and the acoustic level of the bearing will decrease.

The upper limit of the dynamic viscosity of the ester-series lubricating oil at 40° C. can be changed for better workability at the time of filling in the bearing or oil plating treatment. One in the range of ordinary commercial bearing oil grade may also be used. In view of ordinary viscosity grade of bearing oil, the upper limit of the dynamic viscosity of the ester-series lubricating oil used in this invention is 150 mm$^2$/s at 40° C.

To form a lubricating oil film by supplying such an ester-series lubricating oil onto the friction surface of a rolling bearing, it may be dripped on the raceways of the inner and outer rings and the rolling elements. Also, the bearing may be immersed in a liquid in which lubricating oil is diluted with a solvent at a suitable concentration to form a uniform film on the bearing surface. This is what is called oil plating.

Known additives such as rust preventives, antioxidants and oiliness improvers may be added to the ester-series lubricating oil.

As rust preventives that can be added to the lubricating oil, there are such organic sulfonate metal salt as barium sulfonate and calcium sulfonate. As antioxidants, a nitrogen-containing compound-family antioxidant, phenolic antioxidants, or their mixture may be used. Antioxidants of a nitrogen-containing compound family include phenyl-α-naphthylamine, diphenylamine, phenylenediamine, oleilamideamine, and phenothiazine.

Phenolic antioxidants which may be used include hindered phenols such as p-tert-butyl phenyl salicylate, 2,6-di-tert-butyl p-phenyl phenol, 2,2'-methylenebis(4-methyl-6-tert-octyl phenol), 4,4'-butyrylene bis(6-tert-butyl-m-cresol), tetrakis[methylene-3-3(3',5'-di-tert-butyl-4'-hydroxyphenyl)propionate]methane, 1,3,5-trimethyl-2,4,6-tris(3,5-di-tert-butyl-4-hydroxybenzil) benzene, n-octadecyl-β-(4'-hydroxy-3',5'-di-tert-butyl) phenoxy-1,3, 5-triazine, 4-4'-thiobis-[6-tert-butyl-m-cresol], and 2-(2'- hydroxy-3'-tert-butyl-5'-methylphenyl)-5-chlorobenzotriazole.

As oiliness improvers, higher fatty acids such as oleic acid and stearic acid, higher alcohols such as lauryl alcohol and oleyl alcohol, amines such as stearyl amine and cetyl amine, and phospheric esters such as tricresyl phosphate may be used.

Besides these additives, within such a range that the effects of the invention are not impaired, extreme pressure agents, viscosity index improvers and wear preventives may be added. Also, if the durability is not improved sufficiently with the lubricating oil alone, grease may be sealed to such an extent that the rotation torque will not increase but remain within a permissible range.

The rolling bearing according to this invention may be one having a known structure, that is, a bearing in which a plurality of rolling elements are retained by a retainer between the inner and outer rings. A typical one is a ball bearing. In particular, if an oil film of such an ester-series lubricating oil is formed on the friction surface, it is possible to considerably suppress the acoustic effects of the bearing. Thus it is possible to use a ball bearing having an inner ring having an inner diameter of 8 mm or less, with which it was heretofore difficult to suppress acoustic effects. Ball bearings which may be used are not limited as long as they are manufacturable, and the lower limit of the inner diameter of the inner ring of existing ball bearings is 1 mm.

The retainer to be mounted in such a bearing may be made of a known material such as an iron plate, a polyamide resin in which is added glass fiber or whisker, or an oil-containing resin to which is added a lubricating oil. To improve acoustic properties so that no noise or abnormal sounds are produced, a resin retainer is preferable.

A seal device may be used with such a bearing. By attaching a seal device, it is possible to seal grease in the bearing. Portions in which grease is to be sealed, include gaps formed in the bearing such as between the inner ring and the outer ring, between the inner ring, outer ring and the rolling elements, between the inner ring, outer ring and retainer, or between the inner ring, outer ring, rolling element and retainer.

The rolling bearing according to this invention can be used for rotary shafts of information devices such as hard disk drive devices (HDDs), video tape recorders (VTRs), digital audio tape recorders (DATs), and laser beam printers (LBPs). Also, it may be used to support rotary shafts of compact disks such as CD-ROMs and DVDS, and disk memory devices such as high-capacity floppy disk drives.

Specifically, HDDs have a rotary shaft supporting an arm carrying a magnetic head, and a rolling bearing rotatably supporting the rotary shaft. For the rolling bearing, the rolling bearing according to this invention may be used. The above said lubricating oil film should be preferably formed on the friction surface of the rolling bearing.

The base oil of the grease for high-speed rolling bearing according to the invention is not limited if it has such a heat resistance as to endure the use at above 100° C., in view of the fact that if rolling bearings used in an electronic information recording/reproducing device are used under high-speed rotation exceeding 10000 rpm, they may be heated to about 100° C. Its type is not limited. But as base oils, ester-series lubricating oils, synthetic hydrocarbon oils and ether oils are preferable.

As ester-series lubricating oils, diester oils obtained by the reaction of a dibasic acid with a branched alcohol, aromatic ester oils obtained by the reaction of an aromatic tribasic acid with a branched alcohol, and polyol ester oils obtained by the reaction of a polyhydric alcohol and a monobasic acid may be used.

As the diester oil, the same diester oils as those used as a liquid lubricating oil for rolling bearings may be used.

As the aromatic ester oil, the same aromatic ester oils as those used as a liquid lubricating oil for rolling bearings may be used.

As the polyol ester oil (hindered ester oil), the same polyol ester oils as those used as a liquid lubricating oil for rolling bearings may be used.

As polyhydric alcohols, trimethylolpropane (TMP), pentaerythritol (PE), dipentaerythritol (DPE), neopentylglycol (NPG), and 2-methyl-2-propyl-1,3-propanediol (MPPD) may be used.

As monobasic acids, which are materials for polyol ester oils used as a base oil of grease, monohydric fatty acids may be used which are 4–8 in carbon number. Specific examples include acetic acid, valeric acid, caproic acid, caprylic acid, enanthic acid, pelargonic acid, capric acid, undecanoic acid, lauric acid, myristic acid, palmitic acid, beef tallow acid, stearic acid, caploleinic acid, undecylenic acid, linderic acid, tsuzuic acid, physeteric acid, myristoleinic acid, palmitoleic acid, petroselinic acid, oleic acid, elaidic acid, asclepain acid, vaccenic acid, sorbic acid, linoleic acid, linolenic acid, sabinic acid, and ricinolic acid.

As synthetic hydrocarbon oils, poly-α-olefin oil, and cooligomer synthetic oil made from α-olefin and ethylene may be used.

The ether oil used is preferably a phenyl ether oil obtained by introducing an alkyl group 12–20 in carbon number to diphenyl, triphenyl or tetraphenyl ether.

The dynamic viscosity of the base oil used in this invention should be 10 mm$^2$/sec or over at 40° C. With an ester oil having a dynamic viscosity less than 10 mm$^2$/sec at 40° C., a lubricating oil film would not grow sufficiently at the initial stage of rotation of the bearing, and the bearing torque would not be stable due to breakage of lubricating oil film. Also, the upper limit of dynamic viscosity of the base oil used in this invention is, in view of the torque of the rotary shaft, 200 mm$^2$/s or less, preferably 150 mm$^2$/s or less, and more preferably 100 mm$^2$/s or less at 40° C.

As the thickening agent used in this invention, lithium soap or urea may be used.

Lithium soaps which may be used include lithium laurate (C12), lithium myristate (C14), lithium palmitate (C16), lithium margarate (C17), lithium stearate (C18), lithium arachidate (C20), lithium behenate (C22), lithium lignocerate (C24), lithium beef tallow aliphatate, lithium 9-hydroxystearate, lithium 10-hydroxystearate, lithium 12-hydroxystearate, lithium 9,10-hydroxystearate, lithium ricinolate, lithium ricinoelaidate. Among them, lithium stearate and lithium 12-hydroxystearate are especially preferable.

As ureas as thickening agents, known diureas or polyureas expressed by the following formula, may be used.

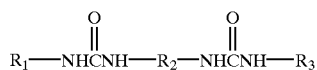

(wherein R2 is an aromatic hydrocarbon group, aliphatic hydrocarbon group or a cycloaliphatic hydrocarbon group 6–15 in carbon number, R1 and R3 are aromatic hydrocarbon groups 6–12 in carbon number, cyclohexyl groups, cyclohexyl derivatives 7–12 in carbon number, or alkyl groups 6–20 in carbon number.) The worked penetration (JIS K2220) of the lubricating grease used in this invention should be 175–250. If it is below 175, the bearing torque will grow large, so that it will be difficult to seal grease in the rolling bearing especially if the bearing is a small-diameter rolling bearing. Also, if over 250, the rolling bearing will suffer poor lubrication during high-speed rotation. Thus, the rolling bearing will produce noise.

The grease of this invention may contain such additives as rust preventives, antioxidants, extreme pressure additives, wear suppressants so as not to impair the object of the present invention.

As rust preventives, organic sulfonate metal salts and esters may be used. Among these, as organic sulfonates, metal salts such as dinonylnaphthalenesulfonic acid and heavy alkylbenzenesulfonic acid may be used. Specific examples include calcium sulfonate, barium sulfonate, and sodium sulfonate.

As esters, partial esters of polybasic carboxylic acids and polyhydric alcohols of sorbitan derivatives, such as sorbitan monolaurate, sorbitan trilaurate, sorbitan monostearate, and sorbitan monooleate may be used.

As antioxidants, a nitrogen-containing compound-family antioxidant, phenolic antioxidants, or their mix may be used. The former includes phenyl-α-naphthylamine, diphenylamine, phenelenediamine, oleilamideamine, and phenothiazine. The latter includes p-tert-butyl phenyl salicylate, and 2,6-di-tert-butyl p-phenylphenol.

EXAMPLE 1

Eight miniature ball bearings (bearing dimensions: 5 mm dia.×13 mm dia.×3 mm, inner and outer rings and rolling elements made from bearing steel, and the retainer made from polyamide 66 resin reinforced with glass fiber) were prepared in which 2 mg of UNISTER H381R made by NIPPON OIL & FAT CO.,LTD. (dynamic viscosity at 40° C.: 48.3 mm$^2$/s) as an ester lubricating oil was dripped on the raceway, and 8.5 mg of grease (MULTEMP SRL made by KYODO YUSHI CO.,LTD.) was sealed.

The bearings were each mounted on a spindle with a preload of 1.6 kgf applied thereto in the axial direction. The spindle was then put in a constant-temperature chamber at 70° C. and a 135-hour endurance test was conducted by rotating them so that the outer rings would rotate at 5400 rpm. After the test, the bearings were taken out and operated for 30 second at 1800 rpm while applying an axial load of 0.8 kgf to measure the vibration value G. Table 1 shows the ratio of the bearing vibration value after the test to the vibration value of the bearing alone as measured before the endurance test. The values in Table 1 are average values for eight bearing specimens.

EXAMPLE 2

Except that UNISTER H481R (made by NIPPON OIL & FAT CO.,LTD. dynamic viscosity at 40° C.: 64.2 mm$^2$/s) was used as an ester lubricating oil, rolling bearings were manufactured in the same manner as in Example 1, and subjected to an endurance test under exactly the same conditions as in Example 1 to measure the vibration values before and after the test. Their ratios are shown in Table 1.

EXAMPLE 3

Except that REOLUBE OTM (made by FMC, dynamic viscosity at 40° C.: 80 mm$^2$/s) was used as an ester lubricating oil, rolling bearings were manufactured in the same manner as in Example 1, and subjected to an endurance test under exactly the same conditions to measure the vibration values before and after the test. Their ratios are shown in Table 1.

COMPARATIVE EXAMPLE 1

Except that REOLUBE LPE602 (made by FMC, dynamic viscosity at 40° C.: 33.5 mm$^2$/s) was used as an ester lubricating oil, rolling bearings were manufactured in the same manner as in Example 1, and subjected to an endurance test under exactly the same conditions to measure the vibration values before and after the test. Their ratios are shown in Table 1.

COMPARATIVE EXAMPLE 2

Except that SYNFLUID 601 (made by SHINNITTETSU CHEMICAL, dynamic viscosity at 40° C.: 30.5 mm$^2$/s), which is a poly-α-olefin oil, was used instead of an ester oil as the lubricating oil, rolling bearings were manufactured in the same manner as in Example 1, and subjected to an endurance test under exactly the same conditions to measure the vibration values before and after the test. Their ratios are shown in Table 1.

COMPARATIVE EXAMPLE 3

Except that SYNFLUID 801 (made by SHINNITTETSU CHEMICAL, dynamic viscosity at 40° C.: 46.0 mm$^2$/s), which is a poly-α-olefin oil, was used instead of an ester oil as the lubricating oil, rolling bearings were manufactured in the same manner as in Example 1, and subjected to an endurance test under exactly the same conditions to measure the vibration values before and after the test. Their ratios are shown in Table 1.

COMPARATIVE EXAMPLE 4

Rolling bearings were manufactured in the same manner as in Example 1 except that 9.5 mg of grease (MULTEMP SRL made by KYODO YUSHI CO.,LTD.) was sealed instead of an ester oil in miniature ball bearings, and subjected to an endurance test under exactly the same conditions to measure the vibration values before and after the test. Their ratios are shown in Table 1.

From the results of Table 1, when the ester lubricating oil in Comparative Example 1, which had a dynamic viscosity at 40° C. of 33.5 mm$^2$/s, was used, after an endurance test under predetermined conditions, the vibration value increased to about 2.3 times the initial value. Also, in Comparative Examples 2 and 3, in which poly-α-olefin oil was used as a lubricating oil instead of an ester oil, the vibration value increased to about twice the initial value. Also, in Comparative Example 4, in which grease was used instead of lubricating oil, the vibration value increased to about 2.3 times the original value.

In contrast, in Examples 1–3, when the ester lubricating oil, which had a dynamic viscosity of 35 mm$^2$/s or over, was used, after an endurance test under predetermined conditions, the vibration value did not exceed 1.6 times the initial value.

Thus, by using an ester oil having a predetermined viscosity as a lubricating oil for rolling bearings, it is possible to suppress acoustic deterioration of the bearing.

EXAMPLE 4–7, COMPARATIVE EXAMPLES 5–7

Grease compositions were prepared by mixing base oil, thickening agent and additive in the ratios shown in Table 2. The contents in the table are in weight %.

For grease compositions obtained (Examples 4–7, Comparative Examples 5–7), the following acoustic measurement test was conducted. The results are shown in Table 2.

<Acoustic Measurement Test for Bearing>

Two 684 bearings (deep groove ball bearings, inner diameter: 4 mm, outer diameter: 9 mm) in which was sealed a grease composition were mounted on a single spindle, and the spindle was driven to rotate each bearing at the speed of 20000 rpm, atmospheric temperature of 100° C., and axial load of 0.8 kgf. Under these rotating conditions, under JIS B1548-1960, noise level (dBA) was measured every 100 hours. At each measurement, if the noise level was less than 42 dBA, the bearings were rotated again under the same conditions as above, and the noise level was measured again 100 hours later. The same measurements were repeated until the noise level reached 42 dBA, and the time taken until the noise level reached 42 dBA was measured. The results are evaluated in four stages as below, and shown in Table 2.

⊚: Time taken until the 42 dBA level was reached was not less than 500 hours

○: Time taken until it was reached was between 300 and 500 hours

Δ: Time taken until it was reached was between 100 and 300 hours

X: Time taken until it was reached was less than 100 hours

As will be apparent from the results of Table 2, with the greases of Comparative Examples 5–7, of which the worked penetration was 265 or over, noise about 42 dBA was produced from the bearings rotating at high speed in less than 100, 500, 300 hours, respectively. It is considered that grease scattered by centrifugal force during high-speed rotation, and no sufficient lubricating oil film was formed on the friction surface.

In contrast, with the greases of Examples 4–7, of which the worked penetration was 175–250, the time taken until the noise level reached 42 dBA was 500 hours or longer. It is thus considered that the grease prolonged the life of the rolling bearings and suppressed malfunction and noise of the device for recording and reproducing electronic information.

According to the present invention, an ester-series lubricating oil having a viscosity in a predetermined range is used for rolling bearings. This suppresses acoustic deterioration of the bearings considerably.

According to the invention, the lubricating grease having its worked penetration adjusted to a predetermined range is difficult to scatter even under centrifugal force during high-speed rotation of the rolling bearing, and exhibits excellent lubricating properties. Thus, when this type of rolling bearings are used for devices for recording and reproducing electronic information and rotated at high speed, no poor lubrication will occur, so that it can rotate stably with low torque without producing noise, and the durability of the bearing improves.

Also, according to the invention, because a base oil contains a lubricating oil having a predetermined dynamic viscosity by a predetermined amount or over, lubricating properties of the high-speed rolling bearing stabilize.

Also, greases that use a lithium soap or a urea as a thickening agent are highly heat-resistant. Thus they are less likely to scatter even when the bearing temperature rises with rotation at high speed. Moreover, such a grease can suppress noise in the rolling bearing. In particular, with a grease containing a thickening agent containing 50 wt % or more of an aliphatic lithium salt 12–24 in carbon member, these effects are obtained reliably.

TABLE 1

| | | lubricating oil | dynamic viscosity at 40° C. (mm²/s) | ratio of vibration value |
|---|---|---|---|---|
| Examples | 1 | H381R (ester oil) | 48.3 | 1.46 |
| | 2 | H481R (ester oil) | 64.2 | 1.26 |
| | 3 | OTM (ester oil) | 80.0 | 1.52 |
| Comparative Examples | 1 | LPE602 (ester oil) | 33.5 | 2.26 |
| | 2 | 601 (poly-α-olefin oil) | 30.5 | 1.91 |
| | 3 | 801 (poly-α-olefin oil) | 46.0 | 2.15 |
| | 4 | SRL (grease) | — | 2.32 |

TABLE 2

| | Examples | | | | Comparative Examples | | |
|---|---|---|---|---|---|---|---|
| | 1 | 2 | 3 | 4 | 1 | 2 | 3 |
| grease composition | | | | | | | |
| base oil | | | | | | | |
| ester oil | 87.5 | 85.5 | 35.5 | 83.5 | 91.5 | 89.5 | — |
| synthetic hydrocarbon oil | — | — | 50 | — | — | — | 86.5 |
| thickening agent (lithium 12-hydroxystearate) | 12 | 14 | 14 | 16 | 8 | 10 | 13 |
| antioxidant<sup>×</sup> | 0.5 | 0.5 | 0.5 | 0.5 | 0.5 | 0.5 | 0.5 |
| base oil dynamic viscosity (40° C., cSt) | 33 | 33 | 31 | 33 | 33 | 33 | 30 |
| worked penetration (JIS K2220) | 230 | 200 | 250 | 175 | 285 | 265 | 270 |
| acoustic properties of rolling bearing | ⊚ | ⊚ | ⊚ | ⊚ | × | ○ | Δ |

×antioxidant: alkylated diphenylamine

What is claimed is:

1. A rolling bearing, having an inner diameter of less than 10 mm, wherein a lubricating oil film of an ester-series lubricating oil having a dynamic viscosity at 40° C. of 35 mm²/s or over is formed on a friction surface of said rolling bearing, wherein a lubricating grease is sealed within said rolling bearing, said grease comprising a base oil and a thickening agent, said base oil consisting of an ester oil, said thickening agent being a lithium hydroxystearate soap, and said grease having its worked penetration (JIS K2220) adjusted to 175–250.

2. A rolling bearing for a rotary shaft of an information device, wherein said rolling bearing as claimed in claim 1 is used to support the rotary shaft of the information device.

3. A rolling bearing for supporting a disk rotary shaft of a disk memory device of an information device, wherein said rolling bearing as claimed in claim 1 is used to support the disk rotary shaft of the disk memory device of the information device.

4. A hard disk drive device, comprising a magnetic disk, a rotary shaft for supporting said magnetic disk, and said rolling bearing as claimed in claim 1 for rotatably supporting said rotary shaft.

5. A hard disk drive device, comprising a magnetic head, a rotary shaft for supporting an arm carrying said magnetic head, and said rolling bearing as claimed in claim 1 for rotatably supporting said rotary shaft.

* * * * *